United States Patent
Lee et al.

(10) Patent No.: US 10,321,507 B2
(45) Date of Patent: Jun. 11, 2019

(54) METHOD AND APPARATUS FOR CONFIGURING CAUSE VALUE IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 14/906,439

(22) PCT Filed: Sep. 23, 2014

(86) PCT No.: PCT/KR2014/008851
§ 371 (c)(1),
(2) Date: Jan. 20, 2016

(87) PCT Pub. No.: WO2015/041505
PCT Pub. Date: Mar. 26, 2015

(65) Prior Publication Data
US 2016/0157290 A1     Jun. 2, 2016

Related U.S. Application Data

(60) Provisional application No. 61/881,439, filed on Sep. 23, 2013, provisional application No. 61/881,456, (Continued)

(51) Int. Cl.
*H04W 76/02* (2009.01)
*H04W 76/04* (2009.01)
(Continued)

(52) U.S. Cl.
CPC ........... *H04W 76/18* (2018.02); *H04W 48/18* (2013.01); *H04W 76/27* (2018.02); *H04W 88/02* (2013.01)

(58) Field of Classification Search
None
See application file for complete search history.

(56) References Cited

U.S. PATENT DOCUMENTS

2009/0238143 A1*  9/2009  Mukherjee ........ H04W 36/0022
                                                          370/331
2009/0303971 A1* 12/2009  Kim .................... H04W 76/022
                                                          370/338
(Continued)

FOREIGN PATENT DOCUMENTS

CN    102696260 A    9/2012
CN    103229546 A    7/2013
(Continued)

OTHER PUBLICATIONS

"LTE RRC Connection Setup Messaging", EventHelix.com Inc, 2012, pp. 2 and 5.
(Continued)

*Primary Examiner* — Kevin C. Harper
*Assistant Examiner* — Derrick V Rose
(74) *Attorney, Agent, or Firm* — Birch, Stewart, Kolasch & Birch, LLP

(57) ABSTRACT

A method is provided for transmitting, by a user equipment (UE), a connection request message in a wireless communication system. The UE receives a configuration of a specific value of a configurable establishment cause from a network, initiates a service whose type corresponds to the specific value, sets the configurable establishment cause to the specific value, transmits a radio resource control (RRC) connection request message including the configurable establishment cause which is set to the specific value to the
(Continued)

network, and receives an RRC connection setup message from the network. The RRC connection setup message is determined to be transmitted, by the network, based on the configurable establishment cause set to the specific value, which indicates the type of the service, by the UE.

6 Claims, 7 Drawing Sheets

Related U.S. Application Data filed on Sep. 24, 2013, provisional application No. 61/885,520, filed on Oct. 2, 2013.

(51) Int. Cl.
*H04W 76/18* (2018.01)
*H04W 48/18* (2009.01)
*H04W 76/27* (2018.01)
*H04W 88/02* (2009.01)

(56) References Cited

U.S. PATENT DOCUMENTS

| | | | |
|---|---|---|---|
| 2012/0302196 A1* | 11/2012 | Chin | H04L 65/1073 455/404.1 |
| 2013/0045706 A1 | 2/2013 | Hsu | |
| 2014/0301200 A1* | 10/2014 | Miura | H04W 28/08 370/235 |
| 2016/0286464 A1* | 9/2016 | Wiemann | H04W 48/02 |

FOREIGN PATENT DOCUMENTS

| | | | |
|---|---|---|---|
| EP | 3030022 A1 | 6/2016 | |
| WO | WO 2012/050841 A1 | 4/2012 | |

OTHER PUBLICATIONS

Win Brouwer. "QoS in LTE PSCR Demo Days", Alcatel-Lucent, Dec. 2010, pp. 5-6, 10.
Ericsson et al., "Correction to PDN Deactivation for SIPTO@LN," S2-132098, 3GPP TSG-SA WG2 Meeting #97, Busan, Republic of Korea, May 27-31, 2013, 23 pages.
ZTE, "The report of eNodeB ECN capability," S2-105420, 3GPP TSG-SA WG2 Meeting #82, Jacksonville, Florida, USA, Nov. 15-19, 2010, 60 pages.

* cited by examiner

[Fig. 1]
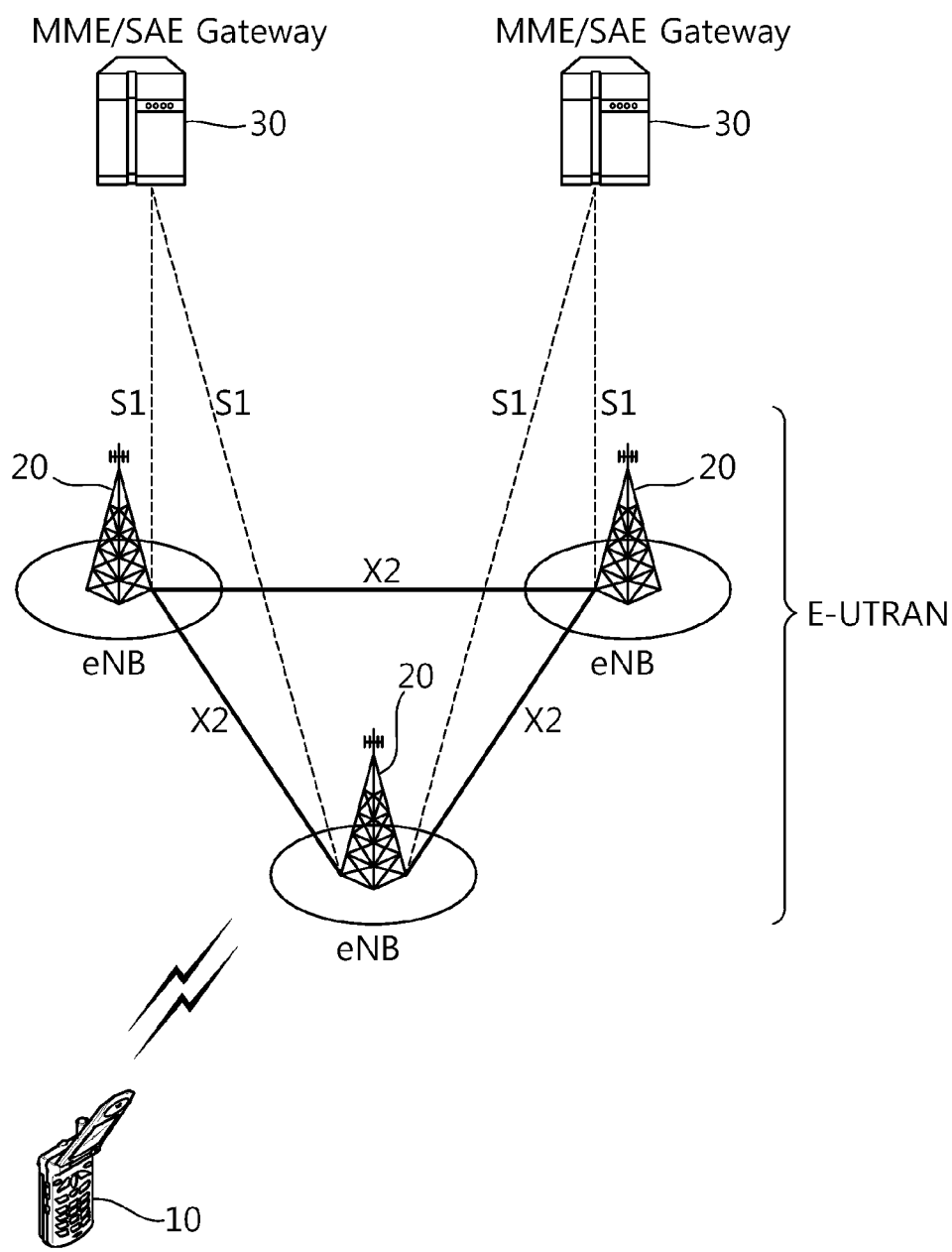

[Fig. 2]
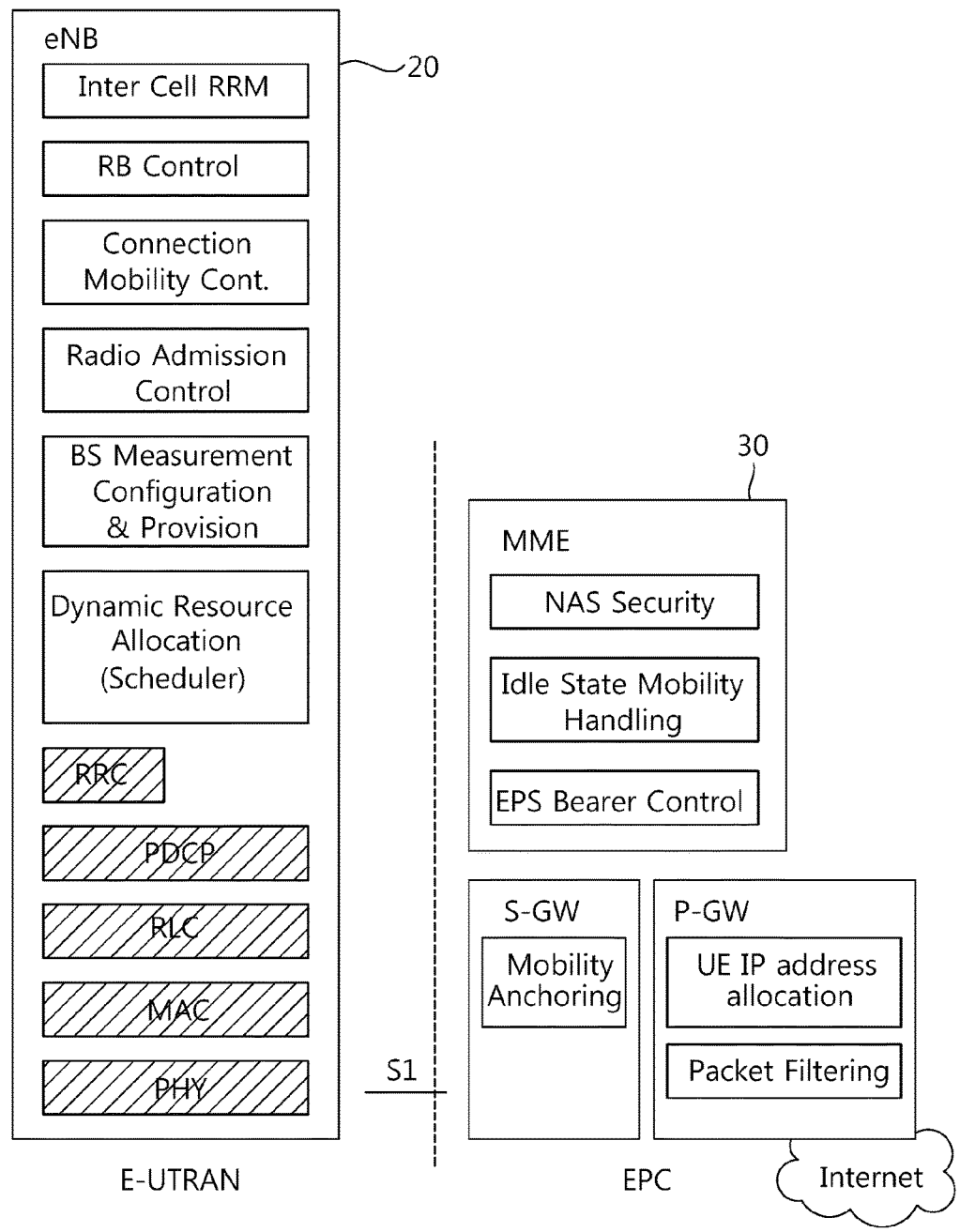

[Fig. 3]
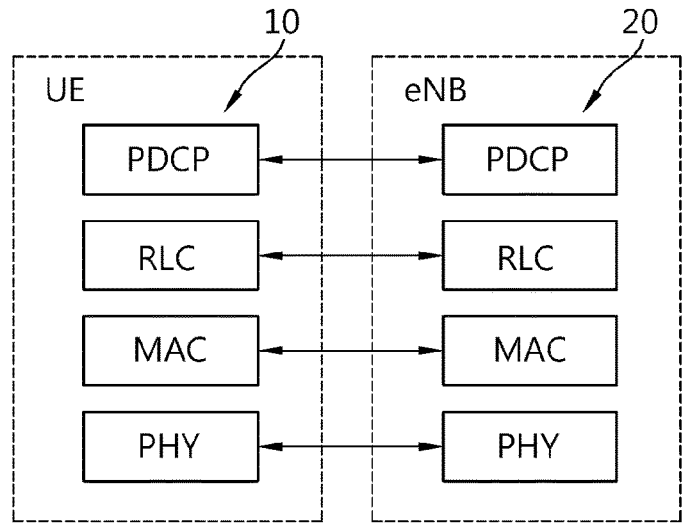
(a)
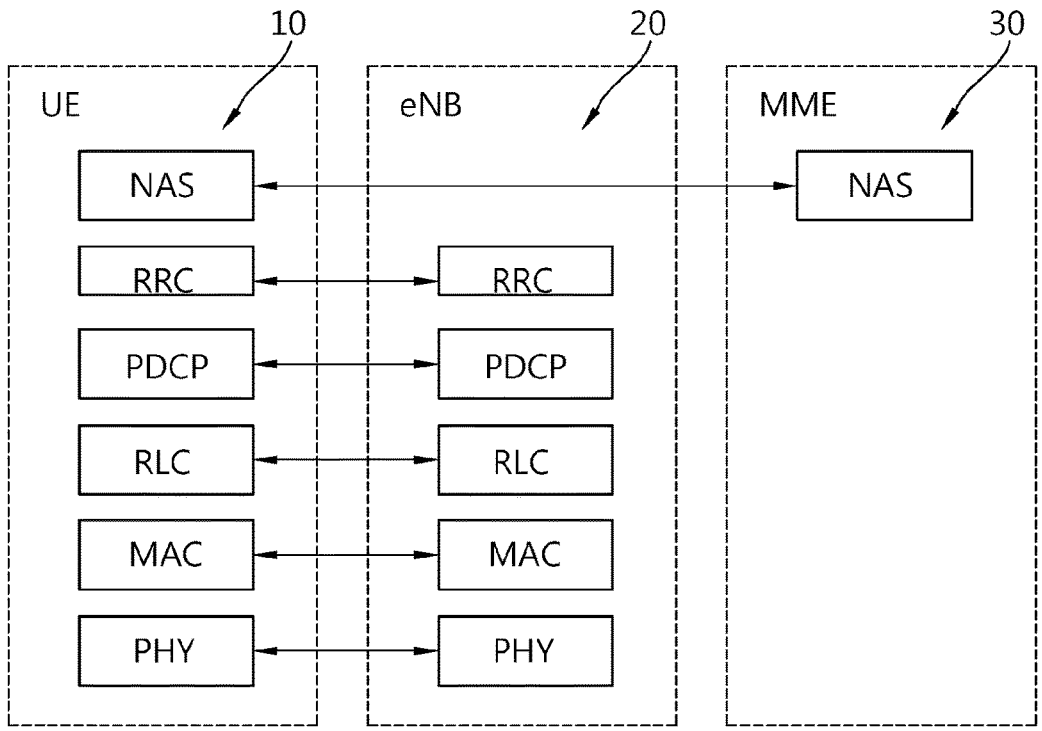
(b)

[Fig. 4]
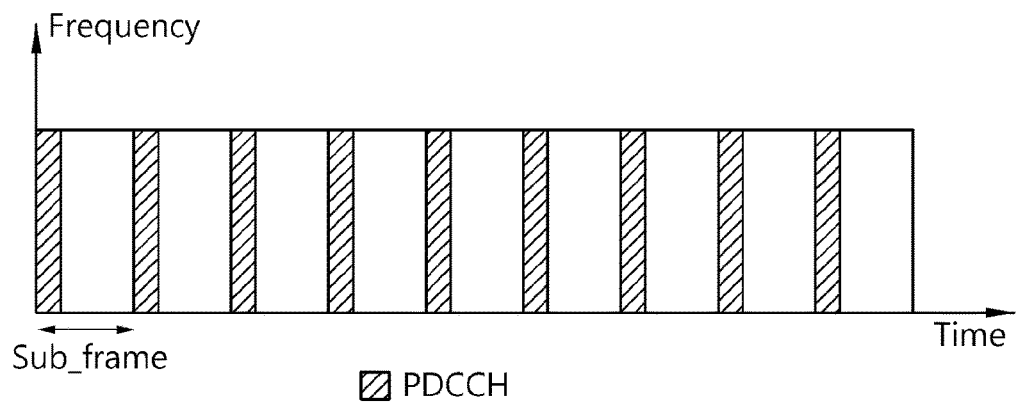
[Fig. 5]
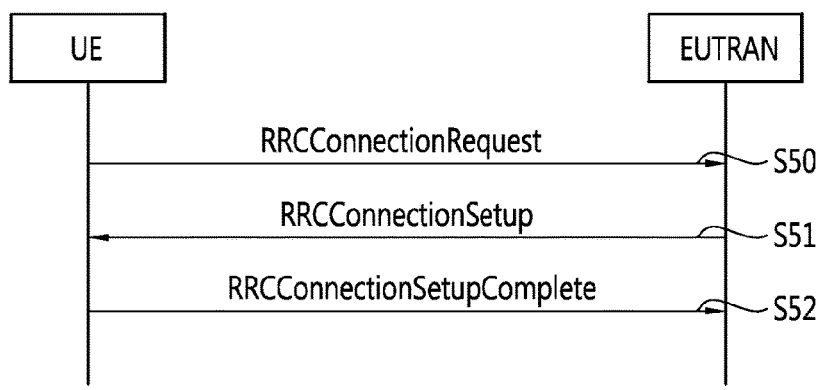
[Fig. 6]
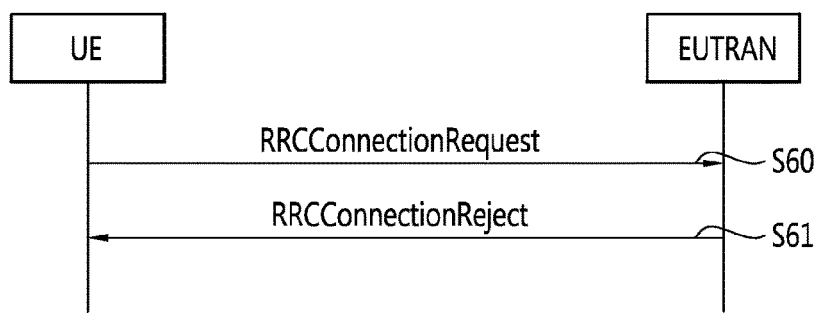

[Fig. 7]
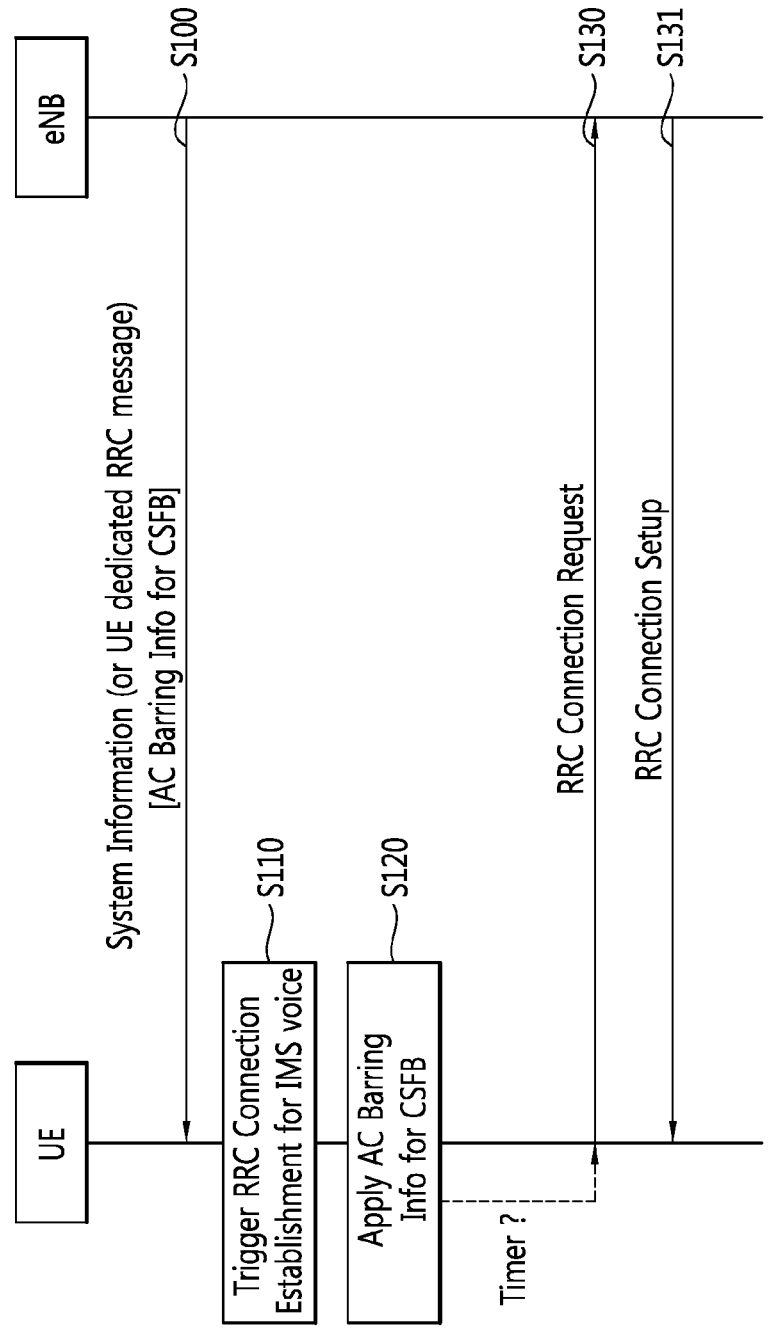

[Fig. 8]
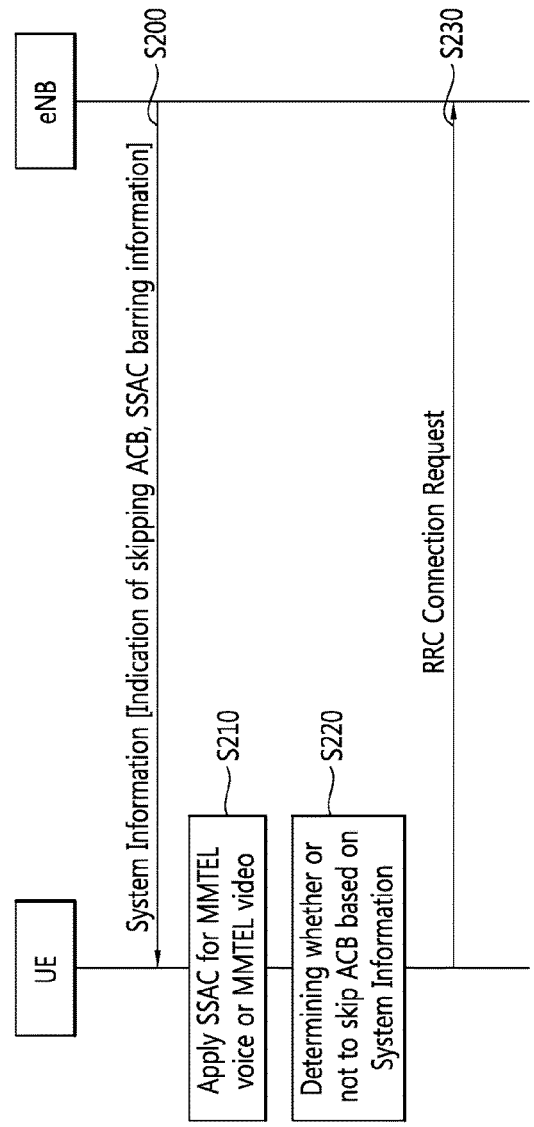
[Fig. 9]
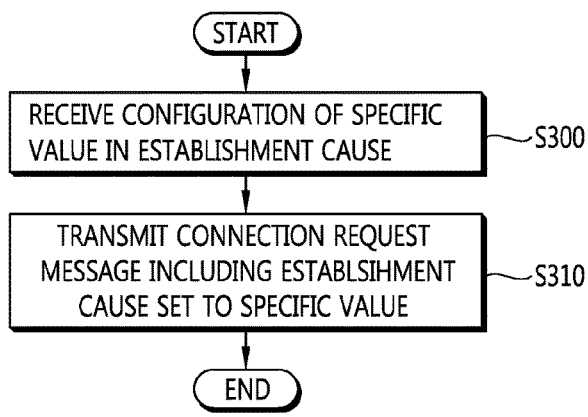

[Fig. 10]
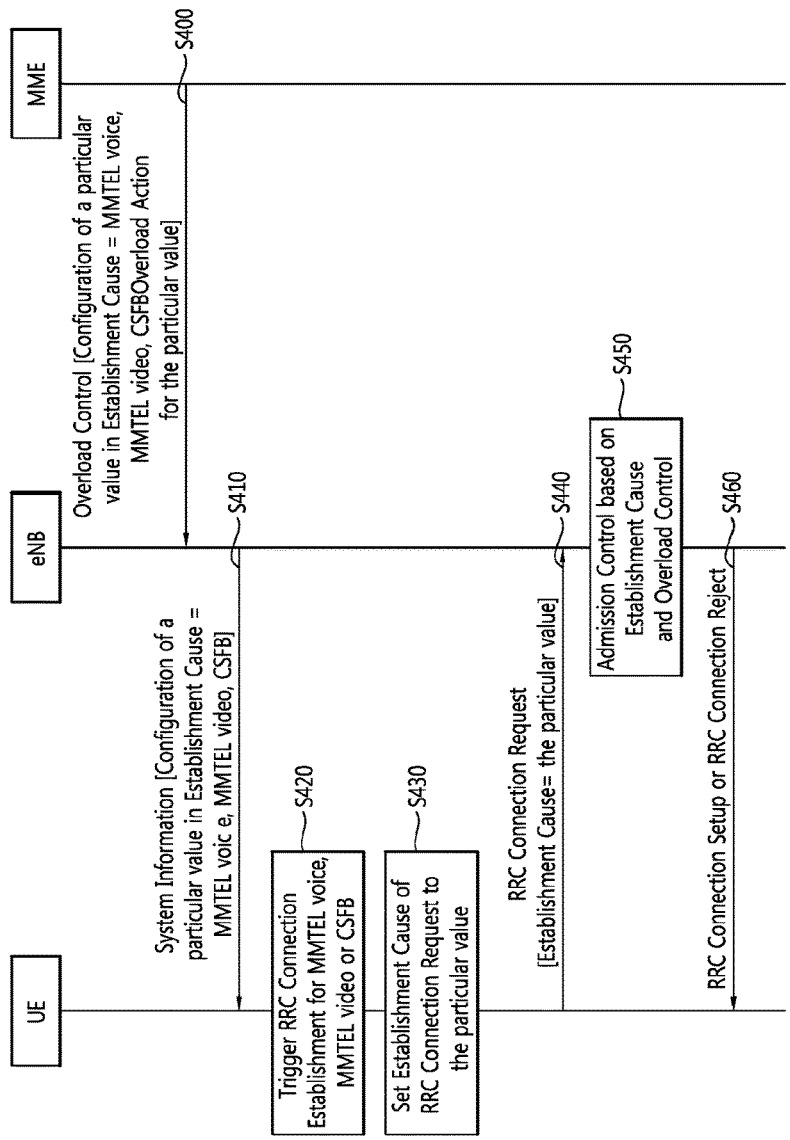
[Fig. 11]
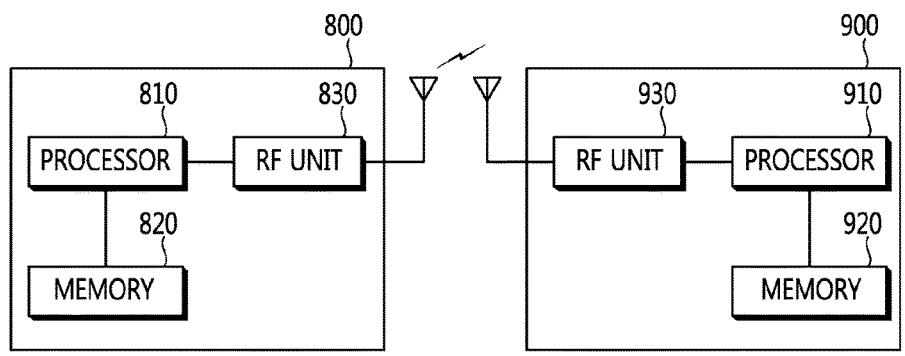

METHOD AND APPARATUS FOR CONFIGURING CAUSE VALUE IN WIRELESS COMMUNICATION SYSTEM

CROSS REFERENCE TO RELATED APPLICATIONS

This application is the National Phase of PCT/KR2014/008851 filed on Sep. 23, 2014, which claims priority under 35 U.S.C. 119(e) to U.S. Provisional Application Nos. 61/881,439 filed on Sep. 23, 2013; 61/881,456 filed on Sep. 24, 2013; and 61/885,520 filed on Oct. 2, 2013, all of which are hereby expressly incorporated by reference into the present application.

TECHNICAL FIELD

The present invention relates to wireless communications, and more particularly, to a method and apparatus for configuring a cause value in a wireless communication system.

BACKGROUND ART

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The purpose of a radio resource control (RRC) connection establishment procedure is to establish an RRC connection. RRC connection establishment involves signaling radio bearer 1 (SRB1) establishment. The RRC connection establishment procedure is also used to transfer an initial non-access stratum (NAS) dedicated information/message from a user equipment (UE) to an evolved UTMS terrestrial radio access network (E-UTRAN). The E-UTRAN applies the RRC connection establishment procedure to establish SRB1 only.

The UE may transmit an RRC connection request message to initiate the RRC connection establishment procedure. The RRC connection request message may include establishment cause for the RRC connection request as provided by the upper layers. An eNodeB (eNB) may proceed or reject the RRC connection request based on the establishment cause included in the RRC connection request message.

Currently, various establishment causes are defined in the RRC connection request message. However, according to a situation, configurable cause value may be needed.

SUMMARY OF INVENTION

Technical Problem

The present invention provides a method and apparatus for configuring a cause value in a wireless communication system. The present invention provides a method for transmitting a connection request message including an establishment cause set to a specific value.

Solution to Problem

In an aspect, a method for transmitting, by a user equipment (UE), a connection request message in a wireless communication system is provided. The method includes receiving a configuration of a specific value of a configurable cause from a network, and transmitting a connection request message including the configurable cause set to the specific value to the network.

In another aspect, a user equipment (UE) in a wireless communication system is provided. The UE includes a radio frequency (RF) unit for transmitting or receiving a radio signal, and a processor coupled to the RF unit, and configured to receive configuration of a specific value of a configurable cause from a network, and transmit connection request message including the establishment cause set to the specific value to the network.

Advantageous Effects of Invention

Configurable cause value can be used variously.

BRIEF DESCRIPTION OF DRAWINGS

FIG. 1 shows LTE system architecture.
FIG. 2 shows a block diagram of architecture of a typical E-UTRAN and a typical EPC.
FIG. 3 shows a block diagram of a user plane protocol stack and a control plane protocol stack of an LTE system.
FIG. 4 shows an example of a physical channel structure.
FIG. 5 shows a successful RRC connection establishment procedure.
FIG. 6 shows an RRC connection establishment procedure which is rejected by a network.
FIG. 7 shows an example of an RRC connection establishment procedure according to an embodiment of the present invention.
FIG. 8 shows an example of an RRC connection establishment procedure according to another embodiment of the present invention.
FIG. 9 shows an example of a method for transmitting a connection request message according to an embodiment of the present invention.
FIG. 10 shows an example of an RRC connection establishment procedure according to another embodiment of the present invention.
FIG. 11 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack and a control plane protocol stack of an LTE system. FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARM). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

RRC connection establishment is described. It may be referred to Section 5.3.3 of 3GPP 36.331 V11.1.0 (2012-09).

FIG. 5 shows a successful RRC connection establishment procedure. In step S50, the UE transmits the RRCConnectionRequest message to the E-UTRAN. In step S51, the E-UTRAN transmits the RRCConnectionSetup message to the UE. In step S52, the UE transmits the RRCConnectionSetupComplete message to the E-UTRAN.

FIG. 6 shows an RRC connection establishment procedure which is rejected by a network. In step S60, the UE transmits the RRCConnectionRequest message to the E-UTRAN. In step S61, the E-UTRAN transmits the RRCConnectionReject message to the UE.

The UE initiates the procedure when upper layers request establishment of an RRC connection while the UE is in RRC_IDLE. Upon initiation of the procedure, the UE shall:
1> if upper layers indicate that the RRC connection is subject to extended access barring (EAB):
2> if the result of the EAB check is that access to the cell is barred:
3> inform upper layers about the failure to establish the RRC connection and that EAB is applicable, upon which the procedure ends;
1> if the UE is establishing the RRC connection for mobile terminating calls:
2> if timer T302 is running:
3> inform upper layers about the failure to establish the RRC connection and that access barring for mobile terminating calls is applicable, upon which the procedure ends;
1> else if the UE is establishing the RRC connection for emergency calls:
2> if SystemInformationBlockType2 includes the ac-BarringInfo:
3> if the ac-BarringForEmergency is set to TRUE:
4> if the UE has one or more access classes, as stored on the universal subscriber identity module (USIM), with a value in the range 11 . . . 15, which is valid for the UE to use:
5> if the ac-BarringInfo includes ac-BarringForMO-Data, and for all of these valid access classes for the UE, the corresponding bit in the ac-BarringForSpecialAC contained in ac-BarringForMO-Data is set to one:
6> consider access to the cell as barred;
4> else:
5> consider access to the cell as barred;
2> if access to the cell is barred:
3> inform upper layers about the failure to establish the RRC connection, upon which the procedure ends;

1> else if the UE is establishing the RRC connection for mobile originating calls:
2> perform access barring check using T303 as "Tbarring" and ac-BarringForMO-Data as "AC barring parameter";
2> if access to the cell is barred:
3> if SystemInformationBlockType2 includes ac-BarringForCSFB or the UE does not support circuit switched (CS) fallback:
4> inform upper layers about the failure to establish the RRC connection and that access barring for mobile originating calls is applicable, upon which the procedure ends;
3> else (SystemInformationBlockType2 does not include ac-BarringForCSFB and the UE supports CS fallback):
4> if timer T306 is not running, start T306 with the timer value of T303;
4> inform upper layers about the failure to establish the RRC connection and that access barring for mobile originating calls and mobile originating CS fallback is applicable, upon which the procedure ends;
1> else if the UE is establishing the RRC connection for mobile originating signalling:
2> perform access barring check using T305 as "Tbarring" and ac-BarringForMO-Signalling as "AC barring parameter";
2> if access to the cell is barred:
3> inform upper layers about the failure to establish the RRC connection and that access barring for mobile originating signalling is applicable, upon which the procedure ends;
1> else (the UE is establishing the RRC connection for mobile originating CS fallback):
2> if SystemInformationBlockType2 includes ac-BarringForCSFB:
3> perform access barring check using T306 as "Tbarring" and ac-BarringForCSFB as "AC barring parameter";
3> if access to the cell is barred:
4> inform upper layers about the failure to establish the RRC connection and that access barring for mobile originating CS fallback is applicable, due to ac-BarringForCSFB, upon which the procedure ends;
2> else:
3> perform access barring check using T306 as "Tbarring" and ac-BarringForMO-Data as "AC barring parameter";
3> if access to the cell is barred:
4> if timer T303 is not running, start T303 with the timer value of T306;
4> inform upper layers about the failure to establish the RRC connection and that access barring for mobile originating CS fallback and mobile originating calls is applicable, due to ac-BarringForMO-Data, upon which the procedure ends;
1> apply the default physical channel configuration;
1> apply the default semi-persistent scheduling configuration;
1> apply the default MAC main configuration;
1> apply the CCCH configuration;
1> apply the timeAlignmentTimerCommon included in SystemInformationBlockType2;
1> start timer T300;
1> initiate transmission of the RRCConnectionRequest message;

The UE shall set the contents of RRCConnectionRequest message as follows:
1> set the ue-Identity as follows:
2> if upper layers provide an SAE-temporary mobile subscriber identity (S-TMSI):
3> set the ue-Identity to the value received from upper layers;
2> else:
3> draw a random value in the range 0 . . . $2^{40}-1$ and set the ue-Identity to this value;
1> set the establishmentCause in accordance with the rmation received from upper layers;

The UE shall submit the RRCConnectionRequest message to lower layers for transmission. The UE shall continue cell re-selection related measurements as well as cell re-selection evaluation. If the conditions for cell re-selection are fulfilled, the UE shall perform cell re-selection.

For reception of the RRCConnectionSetup message, the UE shall:
1> perform the radio resource configuration procedure in accordance with the received radioResourceConfigDedicated;
1> if stored, discard the cell reselection priority rmation provided by the idleMode-MobilityControlInfo or inherited from another RAT;
1> stop timer T300;
1> stop timer T302, if running;
1> stop timer T303, if running;
1> stop timer T305, if running;
1> stop timer T306, if running;
1> perform the actions described below when T302, T303, T305 or T306 expiry or stop;
1> stop timer T320, if running;
1> enter RRC_CONNECTED;
1> stop the cell re-selection procedure;
1> consider the current cell to be the PCell;
1> set the content of RRCConnectionSetupComplete message as follows:
2> set the selectedPLMN-Identity to the PLMN selected by upper layers from the PLMN(s) included in the plmn-IdentityList in SystemInformationBlockType1;
2> if upper layers provide the 'Registered MME', include and set the registeredMME as follows:
3> if the PLMN identity of the 'Registered MME' is different from the PLMN selected by the upper layers:
4> include the plmnIdentity in the registeredMME and set it to the value of the PLMN identity in the 'Registered MME' received from upper layers;
3> set the mmegi and the mmec to the value received from upper layers;
2> if upper layers provided the 'Registered MME':
3> include and set the gummei-Type to the value provided by the upper layers;
2> if connecting as a relay node (RN):
3> include the rn-SubframeConfigReq;
2> set the dedicatedInfoNAS to include the rmation received from upper layers;
2> if the UE has radio link failure or handover failure information available in VarRLF-Report and if the registered PLMN (RPLMN) is included in plmn-IdentityList stored in VarRLF-Report:
3> include rlf-InfoAvailable;
2> if the UE has logged measurements available for E-UTRA and if the RPLMN is included in plmn-IdentityList stored in VarLogMeasReport:
3> include logMeasAvailable;
2> if the UE has connection establishment failure information available in VarConnEstFailReport and if the RPLMN is equal to plmn-Identity stored in VarConnEstFailReport:

3> include connEstFailInfoAvailable;
2> submit the RRCConnectionSetupComplete message to lower layers for transmission, upon which the procedure ends;

For cell re-selection while T300, T302, T303, T305 or T306 is running, the UE shall:
1> if cell reselection occurs while T300, T302, T303, T305 or T306 is running:
2> if timer T302, T303, T305 and/or T306 is running:
3> stop timer T302, T303, T305 and T306, whichever ones were running;
3> perform the actions when T302, T303, T305 or T306 expiry or stop;
2> if timer T300 is running:
3> stop timer T300;
3> reset MAC, release the MAC configuration and re-establish RLC for all RBs that are established;
3> inform upper layers about the failure to establish the RRC connection;

When T300 expires, the UE shall:
1> if timer T300 expires:
2> reset MAC, release the MAC configuration and re-establish RLC for all RBs that are established;
2> store the following connection establishment failure information in the VarConnEstFailReport by setting its fields as follows:
3> clear the information included in VarConnEstFailReport, if any;
3> set the plmn-Identity to the PLMN selected by upper layers from the PLMN(s) included in the plmn-IdentityList in SystemInformationBlockType1;
3> set the failedCellId to the global cell identity of the cell where connection establishment failure is detected;
3> set the measResultFailedCell to include the reference signal received power (RSRP) and reference signal received quality (RSRQ), if available, of the cell where connection establishment failure is detected and based on measurements collected up to the moment the UE detected the failure;
3> if available, set the measResultNeighCells, in order of decreasing ranking-criterion as used for cell re-selection, to include neighbouring cell measurements for at most the following number of neighbouring cells: 6 intra-frequency and 3 inter-frequency neighbours per frequency as well as 3 inter-RAT neighbours, per frequency/set of frequencies (GERAN) per RAT and according to the following:
4> for each neighbor cell included, include the optional fields that are available;
3> if detailed location information is available, set the content of the locationInfo as follows:
4> include the locationCoordinates;
4> include the horizontalVelocity, if available;
3> set the numberOfPreamblesSent to indicate the number of preambles sent by MAC for the failed random access procedure;
3> set contentionDetected to indicate whether contention resolution was not successful for at least one of the transmitted preambles for the failed random access procedure;
3> set maxTxPowerReached to indicate whether or not the maximum power level was used for the last transmitted preamble;
2> inform upper layers about the failure to establish the RRC connection, upon which the procedure ends;

The UE may discard the connection establishment failure information, i.e., release the UE variable VarConnEstFailReport, 48 hours after the failure is detected, upon power off or upon detach.

When T302, T303, T305 or T306 expiry or stop, the UE shall:
1> if timer T302 expires or is stopped:
2> inform upper layers about barring alleviation for mobile terminating access;
2> if timer T303 is not running:
3> inform upper layers about barring alleviation for mobile originating calls;
2> if timer T305 is not running:
3> inform upper layers about barring alleviation for mobile originating signalling;
2> if timer T306 is not running:
3> inform upper layers about barring alleviation for mobile originating CS fallback;
1> if timer T303 expires or is stopped:
2> if timer T302 is not running:
3> inform upper layers about barring alleviation for mobile originating calls;
1> if timer T305 expires or is stopped:
2> if timer T302 is not running:
3> inform upper layers about barring alleviation for mobile originating signalling;
1> if timer T306 expires or is stopped:
2> if timer T302 is not running:
3> inform upper layers about barring alleviation for mobile originating CS fallback;

For reception of the RRCConnectionReject message, the UE shall:
1> stop timer T300;
1> reset MAC and release the MAC configuration;
1> start timer T302, with the timer value set to the waitTime;
1> if the extendedWaitTime is present and the UE supports delay tolerant access:
2> forward the extendedWaitTime to upper layers;
1> if deprioritisationReq is included:
2> start or restart timer T325 with the timer value set to the deprioritisationTimer signalled;
2> store the deprioritisationReq until T325 expiry;
1> inform upper layers about the failure to establish the RRC connection and that access barring for mobile originating calls, mobile originating signalling, mobile terminating access and mobile originating CS fallback is applicable, upon which the procedure ends;

If upper layers abort the RRC connection establishment procedure while the UE has not yet entered RRC_CONNECTED, the UE shall stop timer T300, if running, and reset MAC, release the MAC configuration and re-establish RLC for all RBs that are established;

Access barring check is described.
1> if timer T302 or "Tbarring" is running:
2> consider access to the cell as barred;
1> else if SystemInformationBlockType2 includes "AC barring parameter":
2> if the UE has one or more access classes, as stored on the USIM, with a value in the range 11 . . . 15, which is valid for the UE to use, and
2> for at least one of these valid access classes the corresponding bit in the ac-BarringForSpecialAC contained in "AC barring parameter" is set to zero:
3> consider access to the cell as not barred;
2> else:
3> draw a random number 'rand' uniformly distributed in the range: 0≤rand<1;
3> if 'rand' is lower than the value indicated by ac-BarringFactor included in "AC barring parameter":
4> consider access to the cell as not barred;

3> else:
4> consider access to the cell as barred;
1> else:
2> consider access to the cell as not barred;
1> if access to the cell is barred and both timers T302 and "Tbarring" are not running:
2> draw a random number 'rand' that is uniformly distributed in the range 0≤rand<1;
2> start timer "Tbarring" with the timer value calculated as follows, using the ac-BarringTime included in"AC barring parameter":

"Tbarring"=(0.7+0.6*rand)*ac-BarringTime.

EAB check is described. The UE shall:
1> if SystemInformationBlockType14 is present and includes the eab-Param:
2> if the eab-Common is included in the eab-Param:
3> if the UE belongs to the category of UEs as indicated in the eab-Category contained in eab-Common; and
3> if for the access class of the UE, as stored on the USIM and with a value in the range 0 . . . 9, the corresponding bit in the eab-BarringBitmap contained in eab-Common is set to one:
4> consider access to the cell as barred;
3> else:
4> consider access to the cell as not barred due to EAB;
2> else (the eab-PerPLMN-List is included in the eab-Param):
3> select the entry in the eab-PerPLMN-List corresponding to the PLMN selected by upper layers;
3> if the eab-Config for that PLMN is included:
4> if the UE belongs to the category of UEs as indicated in the eab-Category contained in eab-Config; and
4> if for the Access Class of the UE, as stored on the USIM and with a value in the range 0 . . . 9, the corresponding bit in the eab-BarringBitmap contained in eab-Config is set to one:
5> consider access to the cell as barred;
4> else:
5> consider access to the cell as not barred due to EAB;
3> else:
4> consider access to the cell as not barred due to EAB;
1> else:
2> consider access to the cell as not barred due to EAB;
Service specific access control (SSAC) in multimedia telephony (MMTEL) layer is described. It may be referred to Annex J.2.1.1 of 3GPP TS 24.173 V11.2.0 (2012-03). The following information is provided by lower layer:
BarringFactorForMMTEL-Voice: barring rate for MMTEL voice;
BarringTimeForMMTEL-Voice: barring timer for MMTEL voice;
BarringFactorForMMTEL-Video: barring rate for MMTEL video; and
BarringTimeForMMTEL-Video: barring timer for MMTEL video.
Upon request from a user to establish a MMTEL communication session, the UE shall:
1> if the MMTEL communication session to be established is an emergency session, then skip the rest of steps below and continue with session establishment;
2> retrieve SSAC related information mentioned above from lower layers;
3> if video is offered in the multimedia telephony communication session:
A> if back-off timer Tx is running, reject the MMTEL communication session establishment and skip the rest of steps below; or
B> else, then:
I> draw a new random number "rand1" that is uniformly distributed in the range 0≤rand1<1; and
II> if the random number "rand1" is lower than BarringFactorForMMTEL-Video, then skip the rest of steps below and continue with session establishment;
III> else, then;
i> draw a new random number "rand2" that is uniformly distributed in the range 0≤rand2<1; and
ii> start back-off timer Tx with the timer value calculated using the formula:

Tx=(0.7+0.6*rand2)*BarringTimeForMMTEL-Video;
and iii> reject the multimedia telephony communication session establishment and skip the rest of steps below;
4> if audio is offered in the MMTEL communication session:
A> if back-off timer Ty is running, reject the MMTEL communication session establishment and skip the rest of steps below; or
B> else, then;
I> draw a new random number "rand3" that is uniformly distributed in the range 0≤rand3<1; and
II> if the random number "rand3" is lower than BarringFactorForMMTEL-Voice, then skip the rest of steps below and continue with session establishment;
III> else, then;
i> draw a new random number "rand4" that is uniformly distributed in the range 0≤rand4<1; and
ii> start timer Ty with the timer value calculated using the formula:

Ty=(0.7+0.6*rand4)*BarringTimeForMMTEL-Voice;
and iii> reject the multimedia telephony communication session establishment;
SSAC is not activated when the UE is in other radio accesses (e.g., UTRAN/GERAN). And when the UE camping on E-UTRAN moves to other radio accesses (e.g., UTRAN/GERAN), back-off timer (Tx or Ty or both) shall be stopped if running.
Handling of service specific access control (SSAC) related parameters is described. Upon request from the upper layers, the UE shall:
1> set the local variables BarringFactorForMMTEL-Voice and BarringTimeForMMTEL-Voice as follows:
2> if the UE is in RRC_IDLE and ssac-BarringForMMTEL-Voice is present:
3> if the UE has one or more access classes, as stored on the USIM, with a value in the range 11 . . . 15, which is valid for the UE to use, and
3> if, for at least one of these access classes, the corresponding bit in the ac-BarringForSpecialAC contained in ssac-BarringForMMTEL-Voice is set to zero:
4> set BarringFactorForMMTEL-Voice to one and BarringTimeForMMTEL-Voice to zero;
3> else:
4> set BarringFactorForMMTEL-Voice and BarringTimeForMMTEL-Voice to the value of ac-BarringFactor and ac-BarringTime included in ssac-BarringForMMTEL-Voice, respectively;
2> else set BarringFactorForMMTEL-Voice to one and BarringTimeForMMTEL-Voice to zero;

1> set the local variables BarringFactorForMMTEL-Video and BarringTimeForMMTEL-Video as follows:
2> if the UE is in RRC_IDLE and ssac-BarringForMMTEL-Video is present:
3> if the UE has one or more access classes, as stored on the USIM, with a value in the range 11 ... 15, which is valid for the UE to use, and
3> if, for at least one of these access classes, the corresponding bit in the ac-BarringForSpecialAC contained in ssac-BarringForMMTEL-Video is set to zero:
4> set BarringFactorForMMTEL-Video to one and BarringTimeForMMTEL-Video to zero;
3> else:
4> set BarringFactorForMMTEL-Video and BarringTimeForMMTEL-Video to the value of ac-BarringFactor and ac-BarringTime included in ssac-BarringForMMTEL-Video, respectively;
2> else set BarringFactorForMMTEL-Video to one and BarringTimeForMMTEL-Video to zero;
1> forward the variables BarringFactorForMMTEL-Voice, BarringTimeForMMTEL-Voice, BarringFactorForMMTEL-Video and BarringTimeForMMTEL-Video to the upper layers;

The RRCConnectionRequest message is used to request the establishment of an RRC connection. Table 1 shows an example of the RRCConnectionRequest message.

TABLE 1

```
-- ASN1START
RRCConnectionRequest ::= SEQUENCE {
  criticalExtensions CHOICE {
    rrcConnectionRequest-r8 RRCConnectionRequest-r8-IEs,
    criticalExtensionsFuture SEQUENCE { }
  }
}
RRCConnectionRequest-r8-IEs ::= SEQUENCE {
  ue-Identity InitialUE-Identity,
  establishmentCause EstablishmentCause,
  spare BIT STRING (SIZE (1))
}
InitialUE-Identity ::= CHOICE {
  s-TMSI S-TMSI,
  randomValue BIT STRING (SIZE (40))
}
EstablishmentCause ::= ENUMERATED {
  emergency, highPriorityAccess, mt-Access, mo-Signalling,
  mo-Data, delayTolerantAccess-v1020, spare2, spare1}
-- ASN1STOP
```

Referring to Table 1, the establishmentCause field provides the establishment cause for the RRC connection request as provided by the upper layers. With regard to the cause value names, highPriorityAccess concerns AC11 to AC15, 'mt' stands for 'mobile terminating' and 'mo' for 'mobile originating. The randomValue field indicates an integer value in the range 0 to $2^{40}-1$. The ue-Identity field indicates UE identity included to facilitate contention resolution by lower layers.

The SystemInformationBlockType2 IE (hereinafter, SIB2) contains radio resource configuration rmation that is common for all UEs. Table 2 shows an example of the SIB2.

TABLE 2

```
-- ASN1START
SystemInformationBlockType2 ::= SEQUENCE {
ac-BarringInfo SEQUENCE {
ac-BarringForEmergency BOOLEAN,
ac-BarringForMO-Signalling AC-BarringConfig OPTIONAL, --
Need OP
```

TABLE 2-continued

```
ac-BarringForMO-Data AC-BarringConfig OPTIONAL -- Need OP
} OPTIONAL, -- Need OP
radioResourceConfigCommon RadioResourceConfigCommonSIB,
ue-TimersAndConstants UE-TimersAndConstants,
freqInfo SEQUENCE {
ul-CarrierFreq ARFCN-ValueEUTRA OPTIONAL, -- Need OP
ul-Bandwidth ENUMERATED {n6, n15, n25, n50, n75, n100}
OPTIONAL, -- Need OP
additionalSpectrumEmission AdditionalSpectrumEmission
},
mbsfn-SubframeConfigList MBSFN-SubframeConfigList OPTIONAL, --
Need OR
timeAlignmentTimerCommon TimeAlignmentTimer,
...,
lateNonCriticalExtension OCTET STRING (CONTAINING
SystemInformation-BlockType2-v8h0-IEs)
OPTIONAL, -- Need OP
[[ssac-BarringForMMTEL-Voice-r9 AC-BarringConfig OPTIONAL, --
Need OP
ssac-BarringForMMTEL-Video-r9 AC-BarringConfig OPTIONAL --
Need OP ]],
[[ ac-BarringForCSFB-r10 AC-BarringConfig OPTIONAL --
Need OP ]]
}
SystemInformationBlockType2-v8h0-IEs ::= SEQUENCE {
multiBandInfoList SEQUENCE (SIZE (1..maxMultiBands)) OF
AdditionalSpectrum Emission
OPTIONAL, -- Need OR
nonCriticalExtension SystemInformationBlockType2-v9e0-IEs
OPTIONAL -- Need OP
}
SystemInformationBlockType2-v9e0-IEs ::= SEQUENCE {
ul-CarrierFreq-v9e0 ARFCN-ValueEUTRA-v9e0 OPTIONAL, -- Cond
ul-FreqMax
nonCriticalExtension SEQUENCE { } OPTIONAL-- Need OP
}
AC-BarringConfig ::= SEQUENCE {
ac-BarringFactor ENUMERATED {
p00, p05, p10, p15, p20, p25, p30, p40,
p50, p60, p70, p75, p80, p85, p90, p95},
ac-BarringTime ENUMERATED {s4, s8, s16, s32, s64, s128, s256,
s512},
ac-BarringForSpecialAC BIT STRING (SIZE(5))
}
MBSFN-SubframeConfigList ::= SEQUENCE (SIZE
(1..maxMBSFN-Allocations))
OF MBSFN-SubframeConfig
-- ASN1STOP
```

Referring to Table 2, the ac-BarringFactor field indicates a reface for access barring. If the random number drawn by the UE is lower than this value, access is allowed. Otherwise the access is barred. The values are interpreted in the range [0,1): p00=0, p05=0.05, p10=0.10, . . . , p95=0.95. Values other than p00 can only be set if all bits of the corresponding ac-BarringForSpecialAC are set to 0. The ac-BarringForCSFB field indicates access class barring for mobile originating CS fallback. The ac-BarringForEmergency field indicates access class barring for AC 10. The ac-BarringForMO-Data field indicates access class barring for mobile originating calls. The ac-BarringForMO-Signalling field indicates access class barring for mobile originating signaling. The ac-BarringForSpecialAC field indicates access class barring for AC 11-15. The first/leftmost bit is for AC 11, the second bit is for AC 12, and so on. The ac-BarringTime field indicates access barring time value in seconds. The ssac-BarringForMMTEL-Video field indicates service specific access class barring for MMTEL video originating calls. The ssac-BarringForMMTEL-Voice field indicates service specific access class barring for MMTEL voice originating calls.

The SystemInformationBlockType14 IE (hereinafter, SIB14) contains the EAB parameters. Table 3 shows an example of the SIB14.

TABLE 3

```
-- ASN1START
SystemInformationBlockType14-r11 ::= SEQUENCE {
eab-Param-r11 CHOICE {
eab-Common-r11 EAB-Config-r11,
eab-PerPLMN-List-r11 SEQUENCE (SIZE (1..maxPLMN-r11)) OF EAB-
ConfigPLMN-r11
} OPTIONAL, -- Need OR
lateNonCriticalExtension OCTET STRING OPTIONAL, -- Need OP
...
}
EAB-ConfigPLMN-r11 ::= SEQUENCE {
eab-Config-r11 EAB-Config-r11 OPTIONAL -- Need OR
}
EAB-Config-r11 ::= SEQUENCE {
eab-Category-r11 ENUMERATED {a, b, c},
eab-BarringBitmap-r11 BIT STRING (SIZE (10))
}
-- ASN1STOP
```

Referring to Table 3, the eab-BarringBitmap field indicates extended access class barring for AC 0-9. The first/leftmost bit is for AC 0, the second bit is for AC 1, and so on. The eab-Category field indicates the category of UEs for which EAB applies. Value a corresponds to all UEs, value b corresponds to the UEs that are neither in their home plmn (HPLMN) nor in a PLMN that is equivalent to it, and value c corresponds to the UEs that are neither in the PLMN listed as most preferred PLMN of the country where the UEs are roaming in the operator-defined PLMN selector list on the USIM, nor in their HPLMN nor in a PLMN that is equivalent to their HPLMN. The eab-Common field indicates the EAB parameters applicable for all PLMN(s). The eab-PerPLMN-List field indicates the EAB parameters per PLMN, listed in the same order as the PLMN(s) occur in plmn-IdentityList in SystemInformationBlockType1.

Hereinafter, a method for applying access class barring (ACB) for IP multimedia subsystem (IMS) voice according to an embodiment of the present invention is described. ACB considers access control for CSFB voice solution only. Thus, if the UE establishes an RRC connection for IMS voice (i.e., MMTEL voice), the UE may apply ACB for MO data. It means that IMS voice is not prioritized over normal data, but treated as normal data for access control.

In order to solve the problem described above, the method for controlling access for IMS/packet switched (PS) service such as MMTEL voice may be used. At first, a particular IMS/PS service is initiated. The particular IMS/PS service may correspond to one of MMTEL voice, MMTEL video, voice over IP (VoIP), video over IP, MMTEL service, IMS service and operator's service. The network may inform the UE about what the particular service is (e.g., one of MMTEL voice, MMTEL video, VoIP, video over IP, MMTEL service, IMS service and operator's service) by transmitting a dedicated signaling to UE. The UE receives barring information for CS voice call via system information from an eNB for a cell. The barring information for CS voice call may correspond to the ac-BarringForCSFB field in the SIB2 described above. The UE determines whether or not to transmit an access request to the eNB for the cell by using the barring information for CS voice call. The access request may be one of the RRCConnectionRequest message, the RRC connection re-establishment request message, the scheduling request and the random access preamble. The UE transmits the access request to the eNB for setting up a bearer of the particular service with the network, if transmitting the access request is determined for the cell. In the description above, the UE may be in RRC_IDLE or in RRC_CONNECTED.

FIG. 7 shows an example of an RRC connection establishment procedure according to an embodiment of the present invention.

In step S100, the UE camping on a cell receives system information from the cell.

The UE acquires ac-BarringForCSFB in the SIB2 from the cell. The UE should maintain up-to-date ac-BarringForCSFB at the cell according to the BCCH modification period e.g., by periodically checking systemInfoModification in a paging message. Alternatively, the eNB may be able to broadcast ACB information for a particular service such as IMS voice in the SIB14. The eNB may also transmit a paging message including either eab-ParamModification-r11 or modification indication of ACB information for a particular service, in order to inform UEs about update of ACB information for a particular service. In this case, The UE should maintain up-to-date ACB information for a particular service at the cell by periodically checking either eab-ParamModification-r11 or modification indication of ACB information for a particular service from the paging message. And, the UE receives the SIB14 and then acquires ACB information for a particular service such as IMS voice from the SIB14, based on the Paging message.

In step S110, an upper layer of the UE e.g., MMTEL/NAS layer, may initiate a particular IMS service such as MMTEL voice service. Upon initiation of the particular service, an upper layer of the UE informs the RRC layer of the UE about initiation of the particular IMS service such as MMTEL voice, and triggers an RRC connection establishment procedure. In this case, the UE operates as described above only if the particular service is initiated by the UE. The network such as MME or eNB may inform the UE about what the particular service is (e.g., one or more of MMTEL voice, MMTEL video, VoIP, video over IP, MMTEL service, IMS service and operator's service) by transmitting a dedicated signaling to UE.

In step S120, upon initiation of the RRC connection establishment procedure, the RRC layer of the UE applies ACB, based on the ac-BarringForCSFB (or alternatively the access class barring information for a particular service in the SIB14).

The application of ACB may be as follows. Upon initiation of the procedure, the UE shall:

1> if upper layers indicate that the RRC connection is subject to EAB:
2> if the result of the EAB check is that access to the cell is barred:
3> inform upper layers about the failure to establish the RRC connection and that EAB is applicable, upon which the procedure ends;
1> if the UE is establishing the RRC connection for mobile terminating calls:
2> if timer T302 is running:
3> inform upper layers about the failure to establish the RRC connection and that access barring for mobile terminating calls is applicable, upon which the procedure ends;
1> else if the UE is establishing the RRC connection for emergency calls:
2> if SystemInformationBlockType2 includes the ac-BarringInfo:
3> if the ac-BarringForEmergency is set to TRUE:
4> if the UE has one or more access classes, as stored on the USIM, with a value in the range 11 . . . 15, which is valid for the UE to use:
5> if the ac-BarringInfo includes ac-BarringForMO-Data, and for all of these valid access classes for the UE, the corresponding bit in the ac-BarringForSpecialAC contained in ac-BarringForMO-Data is set to one:
6> consider access to the cell as barred;
4> else:
5> consider access to the cell as barred;
2> if access to the cell is barred:
3> inform upper layers about the failure to establish the RRC connection, upon which the procedure ends;
1> else if the UE is establishing the RRC connection for mobile originating calls:
2> perform access barring check using T303 as "Tbarring" and ac-BarringForMO-Data as "AC barring parameter";
2> if access to the cell is barred:
3> if SystemInformationBlockType2 includes ac-BarringForCSFB or the UE does not support CS fallback; of
3> if SystemInformationBlockType2 includes ac-BarringForCSFB or the UE does not support the particular service such as MMTEL voice:
4> inform upper layers about the failure to establish the RRC connection and that access barring for mobile originating calls is applicable, upon which the procedure ends;
3> else (SystemInformationBlockType2 does not include ac-BarringForCSFB and the UE supports CS fallback, or SystemInformationBlockType2 does not include ac-BarringForCSFB and the UE supports the particular service such as MMTEL voice):
4> if timer T306 is not running, start T306 with the timer value of T303;
4> inform upper layers about the failure to establish the RRC connection and that access barring for mobile originating calls and mobile originating CS fallback is applicable, upon which the procedure ends;
1> else if the UE is establishing the RRC connection for mobile originating signalling:
2> perform access barring check using T305 as "Tbarring" and ac-BarringForMO-Signalling as "AC barring parameter";
2> if access to the cell is barred:
3> inform upper layers about the failure to establish the RRC connection and that access barring for mobile originating signalling is applicable, upon which the procedure ends;
1> else (the UE is establishing the RRC connection for mobile originating CS fallback, or the UE is establishing the RRC connection for mobile originating particular service such as MO MMTEL voice):
2> if SystemInformationBlockType2 includes ac-BarringForCSFB:
3> perform access barring check using T306 as "Tbarring" and ac-BarringForCSFB as "AC barring parameter";
3> if access to the cell is barred:
4> inform upper layers about the failure to establish the RRC connection, and also inform upper layers that access barring for mobile originating CS fallback is applicable, or that access barring for mobile originating particular service such as MO MMTEL voice is applicable, due to ac-BarringForCSFB, upon which the procedure ends;
2> else:
3> perform access barring check using T306 as "Tbarring" and ac-BarringForMO-Data as "AC barring parameter";
3> if access to the cell is barred:
4> if timer T303 is not running, start T303 with the timer value of T306;
4> inform upper layers about the failure to establish the RRC connection and that access barring for mobile originating CS fallback and mobile originating calls is applicable, due to ac-BarringForMO-Data, upon which the procedure ends;
1> apply the default physical channel configuration;
1> apply the default semi-persistent scheduling configuration;
1> apply the default MAC main configuration;
1> apply the CCCH configuration;
1> apply the timeAlignmentTimerCommon included in SystemInformationBlockType2;
1> start timer T300;
1> initiate transmission of the RRCConnectionRequest message;

In step S130, the UE transmits the RRCConnectionRequest message to the eNB. In step S131, the eNB transmits the RRCConnectionSetup message to the UE.

Hereinafter, a method for SSAC interaction with indication of skipping ACB according to an embodiment of the present invention is described. SSAC is used to control access attempts for MMTEL-voice and MMTEL-video. The cell broadcasts barring information about MMTEL-voice and MMTEL-video via system information on BCCH. When the UE receives system information, the UE may acquire the barring information. The barring information includes barring factor and barring time. Different sets of barring information are provided for MMTEL-voice and MMTEL-video. If the RRC layer of the UE receives SSAC barring information, the RRC layer of the UE just forwards the received SSAC barring information to the MMTEL layer of the UE. Then, when the UE makes an RRC connection for MMTEL application, the MMTEL layer of the UE decides whether or not to initiate RRC connection establishment based on the SSAC barring information i.e., SSAC barring check. However, following the SSAC barring check, the RRC layer of the UE may need to apply ACB before transmitting the RRCConnectionRequest message. It means that initiation of MMTEL voice/video may be barred due to ACB, even if it is not barred in the SSAC barring check.

FIG. 8 shows an example of an RRC connection establishment procedure according to another embodiment of the present invention.

In step S200, the UE may check whether skipping access barring check of a lower layer, e.g. RRC layer or MAC layer, is indicated in the system information at a cell (by receiving system information, e.g., SIB2). The access barring check of the lower layer may be either access class barring in the RRC layer or random access backoff in the MAC layer. The cell may include the indication of skipping access class barring in the RRC layer in the SIB2. Further, the UE may check whether barring information for MMTEL voice and/or MMTEL video is available in the system information at the cell (by receiving system information, e.g., SIB2). The barring information for MMTEL voice may correspond to ssac-BarringForMMTEL-Voice included in the SIB2 at the cell. The barring information for MMTEL video nay correspond to ssac-BarringForMMTEL-Video included in the SIB2 at the cell.

In step S210, the UE determines whether or not to establish MMTEL voice service and/or MMTEL video service by applying access barring check of a higher layer, i.e. MMTEL layer. The access barring check of the higher layer may be SSAC in the MMTEL layer.

In step S220, the UE determines whether or not to skip ACB for MMTEL voice and/or video service. Specifically, if establishment of MMTEL voice service and/or MMTEL video service are/is determined in the access barring check of the higher layer, if the indication of skipping access barring check of a lower layer is available at the cell, and if only the barring information for MMTEL voice is available at the cell, the UE skips (i.e., not applying) the access barring check of the lower layer only for MMTEL voice, and applies the access barring check of the lower layer for MMTEL video. Alternatively, the UE skips the access barring check of the lower layer for MMTEL voice and MMTEL video. If only the barring information for MMTEL video is available at the cell, the UE skips the access barring check of the lower layer only for MMTEL video, and applies the access barring check of the lower layer for MMTEL voice. Alternatively, the UE skips the access barring check of the lower layer for MMTEL voice and MMTEL video. If the indication of skipping access barring check of a lower layer is not available at the cell, the UE applies the access barring check of the lower layer for MMTEL voice and MMTEL video.

In step S230, the UE transmits an uplink message to the eNB if the access barring check of the lower layer is passed as a result of applying the access barring check of the lower layer. The uplink message may be one of the RRCConnectionRequest message, a random access preamble, a scheduling request, or buffer status report. In the description above, the UE may be in RRC_IDLE or in RRC_CONNECTED.

Hereinafter, a method for configuring configurable cause value for RRC connection request according to an embodiment of the present invention is described. According to the prior art, when the UE transmits the RRCConnectionRequest message, the eNB may reject the request by transmitting the RRCConnectionReject message to the UE, based on the establishment cause included in the RRCConnectionRequest message. However, the eNB may not recognize access for voice service which is treated as access for MO data based on the establishment cause. Considering that operators consider voice services as important services than non-voice services, it is the problem of the prior art that the eNB may reject the RRC connection request for voice service, based on the establishment cause indicating MO data.

FIG. 9 shows an example of a method for transmitting a connection request message according to an embodiment of the present invention.

In step S300, the UE receives a configuration of a specific value of a configurable cause from a network. The configuration of a specific value of a configurable cause may correspond to the specific type of service/access. That is, the configuration may indicate to UEs that the configured type of service/access is configured as access for one or more of emergency board message, MMTEL voice, MMTEL video, VoIP, video over IP, MMTEL service, IMS service and operator's service/application. The configuration may be received via system information. The configurable cause may be the establishment cause included in the RRCConnectionRequest message. Or, the configurable cause may be the cause field included in any uplink RRC message such as an RRC connection reestablishment message.

Upon initiation of the configured type of service/access according to the received configuration, the UE determines to transmit a connection request message. The configured type may be access for one or more of emergency board message, MMTEL voice, MMTEL video, Voice over IP, Video over IP, MMTEL service, IMS service and operator's service/application. Further, the UE sets the configurable cause to the specific value in the connection request message. For example, the UE sets the establishment cause included in the RRCConnectionRequest message to the specific value of MMTEL-voice, in order to indicate initiation of MMTEL-voice.

In step S310, the UE transmits the connection request message including the configurable cause set to the specific value to the network. The configurable cause may indicate the configured type of service/access. As described above, the configurable cause may be the establishment cause, and the connection request message may be the RRCConnectionRequest message. Table 4 shows the RRCConnectionRequest message according to an embodiment of the present invention. The RRCConnectionRequest message described in Table 4 is a modified version of the RRCConnectionRequest message described in Table 1.

TABLE 4

-- ASN1START
RRCConnectionRequest ::= SEQUENCE {
criticalExtensions CHOICE {
rrcConnectionRequest-r8 RRCConnectionRequest-r8-IEs,
criticalExtensionsFuture SEQUENCE { }
}
}
RRCConnectionRequest-r8-IEs ::= SEQUENCE {
ue-Identity InitialUE-Identity,
establishmentCause EstablishmentCause,
spare BIT STRING (SIZE (1))
}
InitialUE-Identity ::= CHOICE {
s-TMSI S-TMSI,
randomValue BIT STRING (SIZE (40))
}
EstablishmentCause ::= ENUMERATED {
emergency, highPriorityAccess, mt-Access, mo-Signalling,
mo-Data, delayTolerantAccess-v1020,
the particular value, spare1}
-- ASN1STOP Referring to Table 4, the EstablishmentCause field includes the particular value, which indicates that this RRCConnectionRequest message is intended to initiate the type of service/access configured by the network.

Upon receiving the connection request message, the network determines whether to reject or to accept the connection request, based on the configurable cause set to the specific value. Then, the network transmits a reject message or an accept message depending on the determination. The reject message may be the RRCConnectionReject message. The accept message may be the RRCConnectionSetup message.

FIG. 10 shows an example of an RRC connection establishment procedure according to another embodiment of the present invention.

In step S400, the CN, i.e., MME, may transmit an overload control message to the eNB over S1 interface. The overload control message may include "configuration of a particular value in the establishment cause", which indicates one of what type of service/access corresponds to the particular value of the establishment cause in the RRCConnectionRequest message. The type of service/access may be one or more of emergency board message, MMTEL voice, MMTEL video, VoIP, video over IP, MMTEL service, IMS service and operator's service/application. For example, the type of service/access may correspond to MO MMTEL voice, MO MMTEL video, and CSFB voice. The overload control message may also include overload action for handling RRC connection requests indicating the particular value in the establishment cause. The overload action may be rejecting/suppressing the RRC connection requests or accepting the RRC connection requests.

In step S410, upon receiving the overload control message, the eNB may broadcast the "configuration of a particular value in the establishment cause' via system information. The particular value may be configured by the eNB, or the network. For example, the "configuration of a particular value in the establishment cause' may indicate that the particular value corresponds to MO MMTEL voice, MO MMTEL video and CSFB voice. The eNB may determine, by itself, and broadcast the 'configuration of a particular value in the establishment cause' via system information, even without receiving the overload control message from the MME. The eNB may also broadcast barring information for the type of service/access corresponding to the particular value, such as ac-BarringInfo in the SIB2.

Upon receiving the 'configuration of a particular value in the establishment cause' from the eNB, the RRC layer of the UE informs the upper layer of the UE about the 'configuration of a particular value in the establishment cause'. If the UE receives the 'configuration of a particular value in the establishment cause' from a cell, the UE supporting the particular value determines to use the particular value at the cell in the RRC connection establishment procedures. Alternatively, the upper layer of the UE may receive the 'configuration of a particular value in the establishment cause' from the CN or a (open mobile alliance (OMA)) server in the network (PLMN). And, the eNB may broadcast 1 bit indication for the establishment cause at a cell, in order to inform UEs that the eNB understands the particular value. If the UE receives the 'configuration of a particular value in the establishment cause' from the network, and if the UE receives the 1 bit indication at a cell of the network (PLMN), the UE supporting the particular value determines to use the particular value at the cell in the RRC connection establishment procedures for the network (PLMN).

In step S420, upon initiation of the configured type of service/access, e.g., MO MMTEL voice, MO MMTEL video or CSFB voice, an upper layer of the UE informs the RRC layer of the UE about the particular value (e.g., one of spare values) of the establishment cause and initiation of the RRC connection establishment procedure.

In step S430, upon initiation of the RRC connection establishment procedure with the particular value, the RRC layer of the UE sets the establishment cause of the RRC-ConnectionRequest message to the particular value.

In step S440, if the UE passes ACB, the UE transmits the RRCConnectionRequest message including the establishment cause set to the particular value.

In step S450, upon receiving the RRCConnectionRequest message, the eNB performs admission control based on both the establishment cause included in the RRCConnectionRequest message and the overload control message.

In step S460, if the eNB determines to reject the RRC connection request by performing the admission control, the eNB transmits the RRCConnectionReject message to the UE. If the eNB determines to accept the RRC connection request by performing the admission control, the eNB transmits the RRCConnectionSetup message to the UE.

FIG. 11 shows a wireless communication system to implement an embodiment of the present invention.

An eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by a user equipment (UE), a radio resource control (RRC) connection request message in a wireless communication system, the method comprising:
   receiving information on a specific value of a configurable establishment cause for a voice service, from an evolved NodeB (eNB);
   initiating the voice service;
   transmitting the RRC connection request message including the configurable establishment cause which is set to the specific value for the voice service to the eNB; and
   receiving an RRC connection setup message from the eNB, if the RRC connection request message is accepted according to the configurable establishment cause set to the specific value for the voice service based on overload of a mobility management entity (MME).

2. The method of claim 1, wherein the voice service includes at least one of multimedia telephony (MMTEL) voice, voice over Internet protocol (IP), MMTEL service and an operator's service/application.

3. The method of claim 1, wherein the information is received via system information.

4. A user equipment (UE) in a wireless communication system, the UE comprising:
   a transceiver configured to transmit or receive a radio signal; and
   a processor coupled to the transceiver,
   wherein the processor is configured to:
      control the transceiver to receive information on a specific value of a configurable establishment cause for a voice service from an evolved NodeB (eNB), initiate the voice service,
      control the transceiver to transmit a radio resource control (RRC) connection request message including the configurable establishment cause which is set to the specific value for the voice service to the eNB, and
      control the transceiver to receive an RRC connection setup message from the eNB, if the RRC connection request message is accepted according to the configurable establishment cause set to the specific value for the voice service based on overload of a mobility management entity (MME).

5. The UE of claim 4, wherein the voice service includes at least one of multimedia telephony (MMTEL) voice, voice over Internet protocol (IP), MMTEL service and an operator's service/application.

6. The UE of claim 4, wherein the information is received via system information.

* * * * *